Nov. 11, 1969   W. E. DURNAN   3,477,545
LUBRICANT DISTRIBUTION SYSTEM
Filed March 9, 1967   4 Sheets-Sheet 1

INVENTOR
WILLIAM E. DURNAN
BY
ATTORNEY

United States Patent Office 3,477,545
Patented Nov. 11, 1969

3,477,545
LUBRICANT DISTRIBUTION SYSTEM
William E. Durnan, Rochelle Park, N.J., assignor to Auto Research Corporation, Boonton, N.J., a corporation of Delaware
Filed Mar. 9, 1967, Ser. No. 621,859
Int. Cl. F01m 1/00; F16n 17/06, 13/22
U.S. Cl. 184—6    5 Claims

ABSTRACT OF THE DISCLOSURE

The present disclosure describes a lubricant distribution system with a plurality of outlets controlled by measuring valves, all having parallel liquid communication to a central high pressure lubricant source and each providing a periodic delivery of a metered quantity of lubricant. Electrical switch means are operated by the pistons of each of the measuring valves when they reciprocate and these are in turn connected by an electric circuit to an indicating means to indicate any distributing unit which fails to operate normally. The indicating means indicates both actuation of the switch means for an excessively long period of time due to failure of movement of a piston, as well as lack of actuation for a long period of time.

SUMMARY OF THE INVENTION

The present invention relates to systems and methods for distributing fluids.

In particular, the present invention relates to systems and methods for distributing a fluid such as a lubricant.

As is well known, there are many applications encountered in industry and throughout all technology where a fluid such as a lubricant is required at a large number of locations and where the fluid for the large number of locations is derived from a single source. Such installations will have a distributing system extending from the source to the several distributing units which, in the case of a lubricant, are respectively situated at or adjacent the bearings to which the lubricant is delivered by the several distributing units.

With systems of this latter type a very serious problem is encountered when any one of the many distributing units fails to operate in its normal manner. Under these conditions it is necessary on the one hand to realize that one or more of the distributing units are not operating properly and on the other hand to find the unit or units which are not operating in the normal manner. On very large machines having hundreds of bearings, for example in the case of textile machines where banks of spinning assemblies are arranged beside each other extremely large areas or in other types of large machines occupying a large floor area and having many bearings, it is a difficult matter to determine, if it is realized that there is faulty lubricant distribution to one or more of the bearings, just where the faculty lubricant delivery is taking place.

The reason for this is that the several distributing units are of relatively small size and are situated over all parts of the machine where the bearings are located, so that it becomes extremely difficult to determine just where the trouble is located. For example, it may well be realized that the total amount of lubricant which is taken from a source is not as much as it should be, so that the operator knows that somewhere in the machine some bearing is starved for lubrication, but when the attendants are required to start at one end of a large and complex machine and inspect it all the way through to its other end to determine which one of literally hundreds of distributing units is not operating properly, there is only a small chance of finding the faulty unit or units in a reasonably short period of time.

It is accordingly a primary object of the invention to provide a fail safe fluid-distributing system which is capable of reliably and automatically indicating not only when part of the system fails to operate normally but also just where the part or parts of the system which are not operating normally are located.

In particular it is an object of the invention to provide a system of this type which lends itself to an easy visual determination of a distributing unit which fails to operate normally.

It is furthermore an object of the invention to provide a fluid-distributing system and method which make it possible to utilize a relatively small number of indicating assemblies for indicating when any one of a relatively large number of distributing units, considerably larger than the number of indicating assemblies, fails to operate normally.

The objects of the invention also include a system which will indicate both normal operation and lack of normal operation.

It is also an object of the invention to provide a fluid distributing system which in the event of failure of any part thereof to operate normally will nevertheless continue to supply the fluid, although not according to a predetermined metered manner, so that, for example, where the fluid is a lubricant there will be perhaps an oversupply of lubricant but under no circumstances starvation of a bearing.

In addition, the objects of the invention include the provision of a system in which the various units are quite rugged and reliable in their operation and can be mounted at any desired attitude so that the mounting of the various distributing units can be carried out at the most varied locations while at the same time providing also a simple but highly reliable indicating arrangements for indicating which one or more of the distributing units fail to operate normally at any time.

Primarily, with the structure of the invention, a suitable source of the fluid which is to be distributed is in communication with a distributing unit which is situated at or adjacent the location where the fluid is required, and this distributing unit will receive the fluid from the source and deliver it to the required location. In accordance with the invention the distributing unit has an indicating means operatively connected thereto for responding automatically to the operation of the dtistributing unit so as to indicate when the distributing unit fails to operate normally.

BRIEF DESCRIPTION OF DRAWINGS

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

DESCRIPTION OF THE PREFERRED EMBODIMENT

Figure 9:
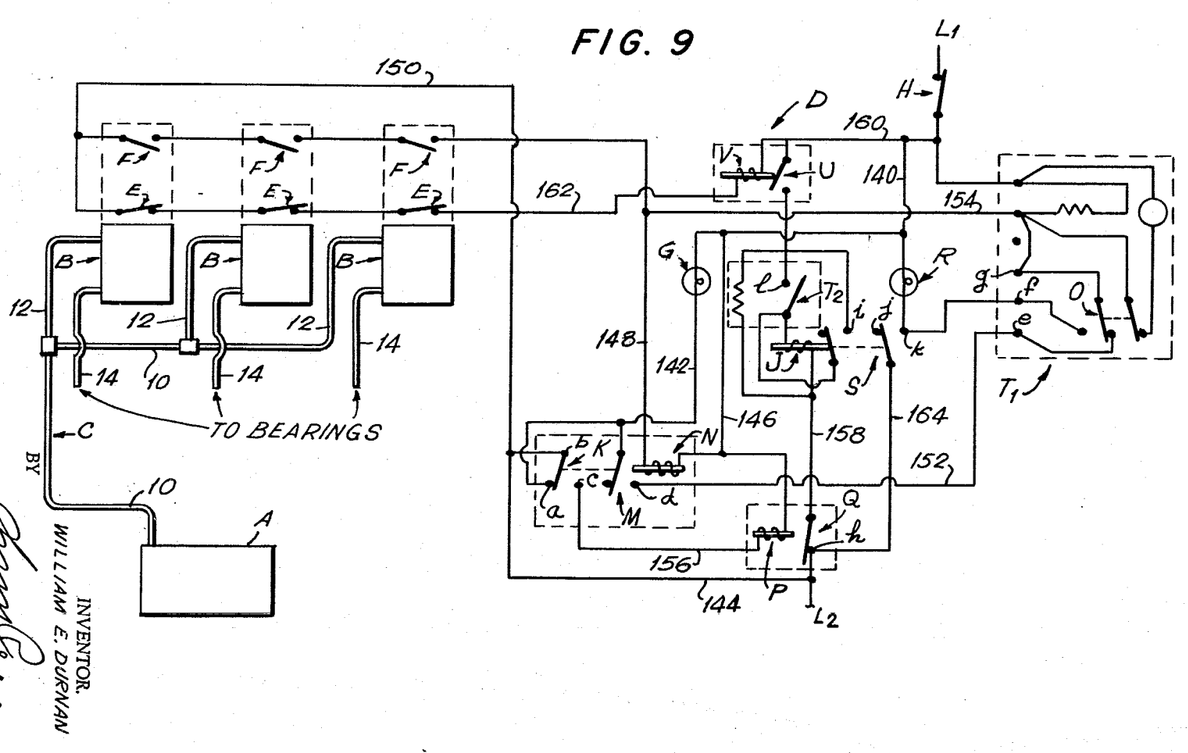
FIG. 9 schematically indicates part of a fluid-distributing system of the invention in cooperation with an electrical indicating assembly of the invention.

Referring now to the drawings, a typical installation is schematically indicated in part in FIG. 9. This installation will include a source A from which is derived the fluid which is to be distributed, and in the example described below this fluid is considered to be a suitable liquid lubricant such as a suitable oil required to be delivered to the bearings of any fairly large and complex mechanism which has many bearings to be served from the single source A. This central supply source A can have any known structure which will include a suitable reservoir from which the fluid is derived as well as a pump driven in any suitable way so as to suck fluid from the reservoir and deliver it under pressure along a conduit 10 which goes all over the machine to the various distributing units B which are respectively situated at or adjacent the bearings which are to be provided with the fluid.

In accordance with one of the features of the invention the several units B are connected in parallel with the supply conduit 10 so that the units B respectively have inlet conduits 12 each of which communicates directly with the supply conduit 10 in the manner indicated in FIG. 9 for the three distributing units B indicated therein. The fluid which is received by the units B by way of their inlet conduits 12 which are connected in parallel with the source A is discharged from the distributing units B through the outlet conduits 14 respectively connected to the several units B and having outlet ends situated at various bearings which are to be provided with the fluid, respectively, as is indicated in FIG. 9.

The details of a distributing unit B of the present invention are shown in FIGS. 1–5. Referring now to FIGS. 1–5, each distributing unit B includes a body means 16 made of a suitable metal such as brass and this body or body means 16 is formed with a passage means which provides in a manner described below the fluid flow resulting in delivery of the fluid through the conduits 14 to the several bearings. The body means 16, in the form of a suitably apertured block of metal, is formed with a pair of through-bores 18 which may be suitably stepped and which are designed to receive mounting bolts which pass through these mounting bores 18 so that the body 16 can be fixedly mounted at any desired location.

Figure 2:
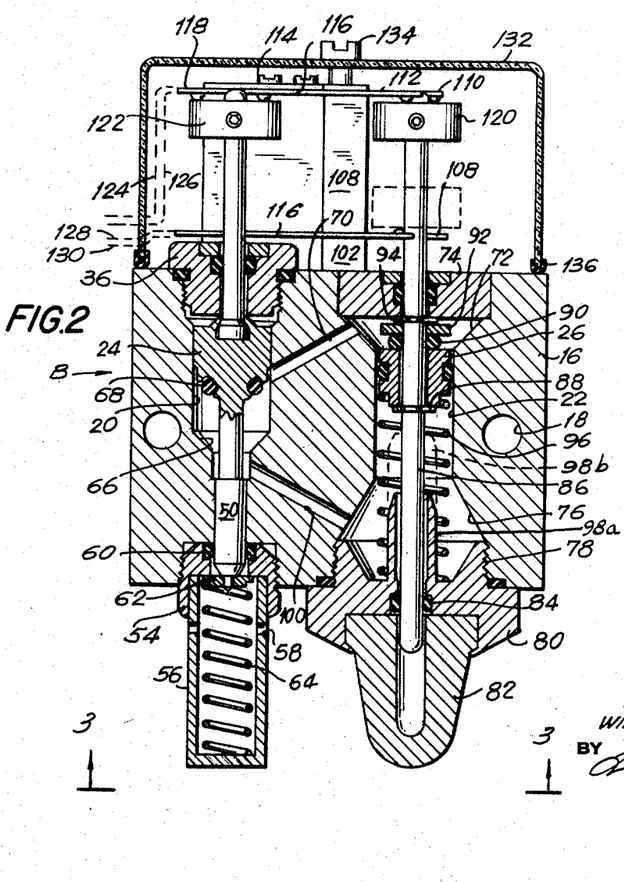
FIG. 2 is a sectional elevation of the structure of FIG. 1 taken along line 2—2 of FIG. 1 in the direction of the arrows.
Figure 3:
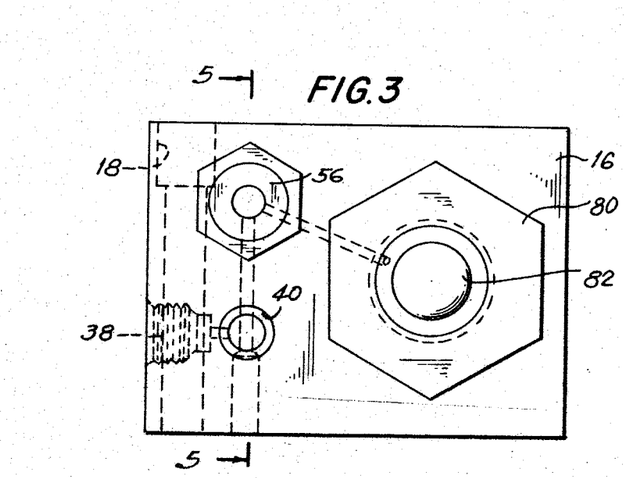
FIG. 3 is a bottom plan view of the structure of FIG. 2 taken along line 3—3 of FIG. 2 in the direction of the arrows.

The passage means which is formed within the body means 16 includes a suitably stepped bore 20 shown at the left in FIG. 2 and extending through the body 16 from its top to its bottom.

A second suitably stepped bore 22 also extends through the body 16. The axis of the bore 22 is parallel to the axis of the bore 20.

The bore 20 accommodates a pilot piston 24 which can reciprocate in a portion of the bore 20 from the top dead-center position of the piston 24 shown in FIG. 2 while the bore 22 accommodates a metering piston 26 which can move along a bore portion of the bore 22 from the top dead-center position of the metering piston 26 which is indicated in FIG. 2.

Figure 4:
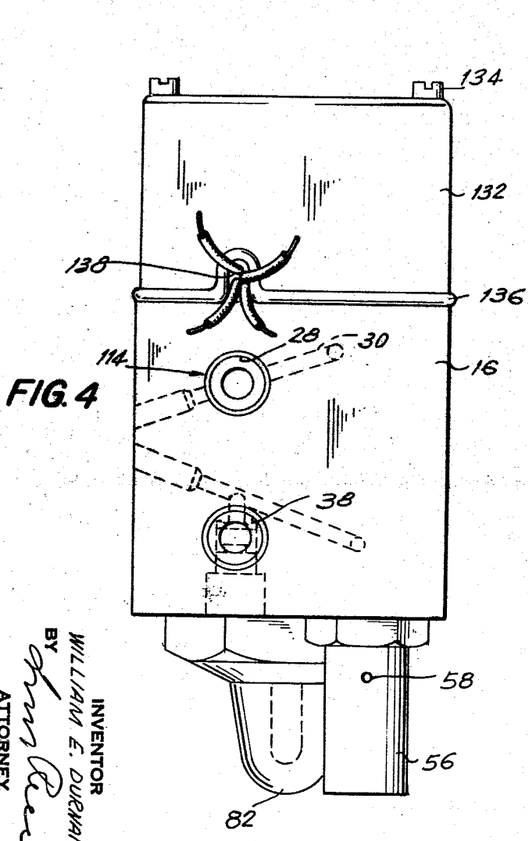
FIG. 4 is a view of the structure of FIGS. 1–3 as seen from the left side of FIGS. 1–3, so that FIG. 4 is an end elevation of the structure of FIGS. 1–3.

Referring to FIG. 4, the end surface of the body 16 which is visible in FIG. 4 is formed with a stepped and tapped bore 28 which receives the inlet conduit 12 with any suitable fluid-tight fitting such as a compression fitting or the like connecting an end of the conduit 12 to the body 16 at its inlet bore 28. This bore 28 has a reduced diameter portion inwardly of the exterior surface of the body 16, and this portion of reduced diameter communicates with an inclined bore 30 which is formed in the body 16 in the manner shown in FIG. 5. This inclined bore 30 has adjacent the exterior of the body 16 a portion of enlarged diameter which is fluid-tightly closed by a plug 32 which is driven into the outer end of the bore 30 and has an exterior surface flush with the exterior surface of the body 16. Of course, the plug 32 has its inner end terminating a substantial distance short of the place where the tapped bore 28 communicates with the bore 30, so that the fluid which enters through the bore 28 can flow freely along the bore 30 to the bore 20 in which the piston 24 is situated.

Figure 5:
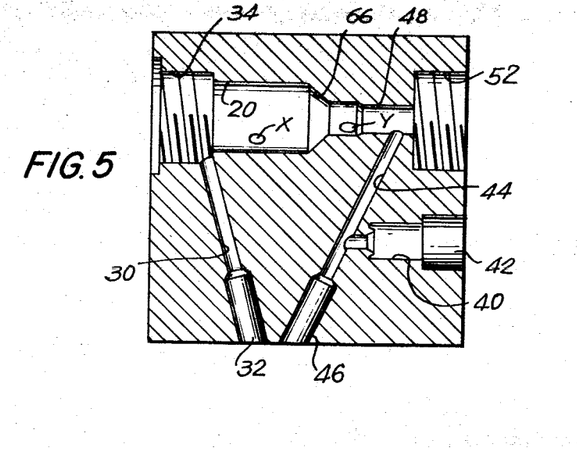
FIG. 5 is a transverse section of the piston-carrying body of the assembly of FIGS. 1–4, FIG. 5 being taken along line 5—5 of FIG. 3 in the direction of the arrows.

As is shown in FIG. 5, the part of the bore 20 which receives the piston 24 is situated next to an enlarged tapped bore portion 34 which receives a bored plug 36 in a fluid-tight manner, as indicated in FIG. 2, and the purpose of this plug 36 is described in greater detail below. The plug 36 of course determines with its bottom end face the top dead-center position of the piston 24, and this piston 24 has a central raised portion, as indicated in FIG. 2, so that the upper surface of the piston 24 which surrounds its central raised portion is situated at the shoulder which is defined between the portion of the bore 20 which receives the piston 24 and the larger tapped bore portion 34. It is precisely at this region that the bore 30 communicates with the space between the top end of the piston 24 and the bottom of the plug 36, so that in this way the fluid under pressure can enter into each distributing unit at the top face of the pilot piston 24 therein.

Returning now to FIG. 4, situated beneath the tapped inlet bore 28 is a tapped discharge bore 38 identical with the bore 28 and connected in a fluid-tight manner to a discharge conduit 14 which may carry a non-return valve in the region of the discharge bore 38 so that the fluid can flow out of the unit B into the conduit 14 but not in the reverse direction. This tapped bore 38, which appears in dotted lines in FIG. 3, has the same construction as the tapped bore 28, and the inner portion of reduced diameter of the bore 38 communicates with a bore 40 which is stepped as indicated in FIG. 5 and which extends upwardly from the bottom end of the body 16.

At its bottom end the bore 40 has a portion of enlarged diameter fluid-tightly closed by a plug 42 (FIG. 5) driven into this portion of enlarged diameter of the bore 40 and having a bottom face flush with the bottom surface of the block 16. It is through this bore 40 that the discharge bore 38 communicates with an inclined bore 44 shown most clearly in FIG. 5. The top end of the bore 40 directly communicates with the bore 44, while the inner end of the bore 38 communicates directly with the bore 40, so that in this way fluid is discharged through the bore 44 into the upper end of the bore 40 and from the latter out through the tapped bore 38 into the discharge conduit 14 and through a non-return valve carried thereby, before reaching the bearing or the like to which the fluid is to be delivered.

It will be noted from FIG. 5 that the outer end of the bore 44 is enlarged in the same way as the outer end of the bore 30, and this outer end of the bore 44 receives a plug 46 in the form of a suitable length of metal driven into the enlarged outer end portion of the bore 44 and having an outer end surface flush with the exterior side surface of the block 16.

The innermost end of the discharge bore 44 communicates with a lower portion 48 of the bore 20, and this lower portion 48 is of relatively small diameter and receives in a slidable, fluid-tight manner, a portion 50 of the stem of the piston 24. This bore portion 48 is situated directly next to an enlarged tapped bore portion 52 of the bore 20. A suitable fitting 54 is threaded into the bore portion 52 and fixedly carries a tubular housing 56 formed with openings 58 through which air can flow freely into and out of the housing 56.

A suitable sealing gland in the form of an O-ring 60, for example, surrounds the stem 50 so that this stem slides in a fluid-tight manner into and out of the housing 56 during reciprocation of the piston 24. The bottom end of the stem of the piston 24 has a small tip received in a washer 62 engaging the top end of a coil spring 64 which is compressed within the housing 56 in the manner shown in FIG. 2, and in the top dead-center position of the piston 24 shown in FIG. 2 the spring 64 has a predetermined amount of compression already applied thereto.

Just above the bore portion 48 which slidably receives the piston stem portion 50, the bore 20 has a frustoconical seat portion 66 which limits the downward movement of the piston 24 and determines the bottom dead-center position thereof. The lower surface of the piston 24 has a configuration conforming substantially to that of the seat 66 and carrying a sealing ring in the form of the elastic O-ring indicated in FIG. 2, so that when the piston 24 reaches its bottom dead-center position the ring 68 will press against the surface 66 to provide a fluid-tight closure at this surface.

When the piston 24 is at its lower dead-center position its top surface is situated just beneath the lower end of a bore 70 which is formed in the body 16 and provides communication between the bores 20 and 22, as indicated in FIG. 2.

The bore 70 is inclined upwardly from the bore 20 into a space within the bore 22 which is defined by the frustoconical surface 72 situated just above and extending upwardly from the top surface of the metering piston 26 when the latter is in its top dead-center position shown in FIG. 2. The space defined by the frustoconical surface 72 is limited at its upper end by a plug 74 which is pressed into the body 16 so as to be fluid-tightly fixed thereto in the manner indicated in FIG. 2.

At its lower portion the bore 22 has a frustoconically enlarged portion 76 terminating at its lower end in a tapped portion 78 which receives a threaded plug 80 in a fluid-tight manner, as shown at the lower right portion of FIG. 2. This plug 80 is axially bored and fixedly carries a lower guide 82 and an O-ring 84 which slideably surrounds in a fluid-tight manner a stem 86 which forms a stem for the piston 26 and which is freely slidable within the guide 82 and through the sealing ring 84.

This stem 86 carries, in a groove thereof, a snap-ring 88 which engages the bottom end of the piston 26 so as to limit upward movement of the stem 86 with respect to the piston 26 and it will be noted that this stem 86 passes freely through an axial bore of the metering piston 26. At its portion which is at the region of the top surface of the piston 26 the stem 86 is surrounded by an elastic O-ring 90 situated just beneath a washer 92 which is in turn situated just beneath a second snap-ring 94 situated in a groove of the stem 86 and engaging the lower surface of the plug 74, so that in this way the elevation of the piston 26, when in its top dead-center position shown in FIG. 2, is determined.

A coil spring 96 surrounds the portion of the stem 86 which is situated beneath the piston 26 and engages the bottom end of the latter to urge it upwardly to the position shown in FIG. 2.

This spring 96 also surrounds a tubular portion 98a of the plug 80, and it is the engagement of the top end of the tubular portion 98a of the plug 80 with the bottom end of the piston 26, or more precisely the snap-ring 88, which determines the bottom dead-center position of the piston 26. By providing different plugs 80 with tubular portions corresponding to the tubular portion 98a and having different lengths it is possible to determine the stroke of the piston 26 and thus the metered amount of fluid which will be delivered from the unit B. Thus, FIG. 2 shows in dotted lines a tubular plug portion 98b longer than the portion 98a so that where a plug having a tubular portion 98b is used, the stroke of the piston 26 will be shorter and the amount of fluid delivered at each cycle will be correspondingly reduced.

The portion of the bore 22 which is beneath the metering piston 26 communicates with the bore 20 through an inclined bore 100 which rises upwardly from the enlarged bore portion 76 of the bore 22 and communicates with the bore 20 just beneath the seat 66 thereof and at an elevation just above the portion 48 of the bore 20.

Figure 6:
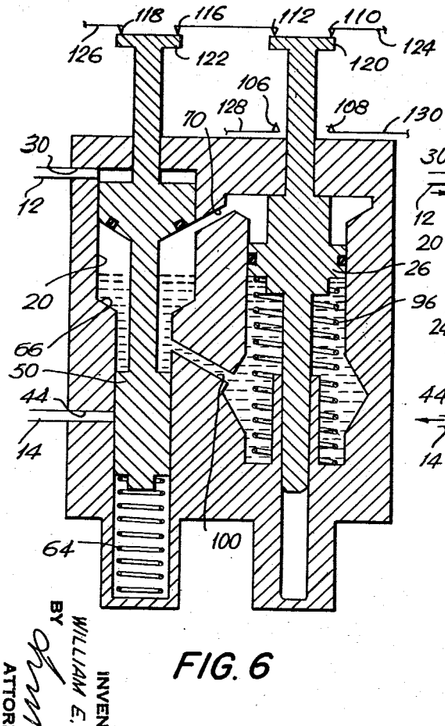
FIG. 6 schematically illustrates the operation of the structure of FIGS. 1–5, FIG. 6 showing the position which the parts take at the beginning of an operating cycle.
Figure 7:
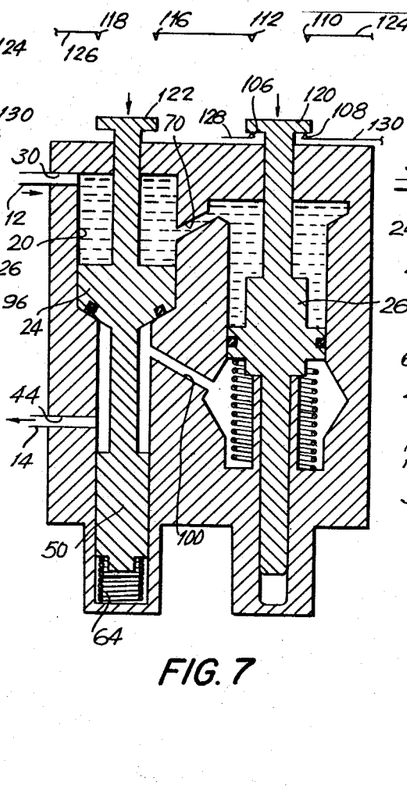
FIG. 7 shows the parts of FIG. 6 in the position which they take at an intermediate part of an operating cycle.
Figure 8:
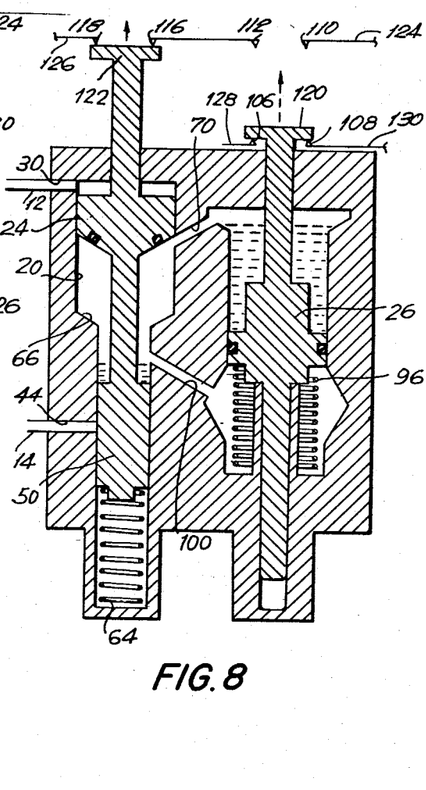
FIG. 8 shows the parts of FIGS. 6 and 7 returning toward the position of FIG. 6 so as to complete the operating cycle illustrated in FIGS. 6–8.

The distributing unit, described above and shown in FIGS. 1–5, is schematically illustrated in FIGS. 6–8 which represent the operation of the distributing unit through one cycle of operation. Referring to FIG. 8, the structure is shown therein approaching the end of an operating cycle. Fluid which is in the bore 22 above the piston 26 will be transferred through the bore 70 into the bore 20, so that in this way the new metered charge which is to be delivered has been transferred from the bore 22 into the bore 20 beneath the piston 24 wherein by this time the parts reach the end of an operating cycle.

The parts are shown in this latter position in FIG. 6. The fluid under pressure is delivered through the inlet conduit 12 and bore 30 to the top surface of the piston 24 and the pressure is sufficiently great to advance the piston 24 downwardly while compressing the spring 64 so as to store energy therein. In this way the metered amount of fluid which was transferred into the bore 20 at the end of the operating cycle as described above is displaced downwardly while the stem portion 50 slides downwardly, and in this way the piston 24 approaches the seat 66.

Just before the piston 24 reaches the seat 66 its top surface will move downwardly beyond the lower end of the bore 70 so that now the fluid under pressure is placed in sudden communication with the space on top of the metering piston 26. The result is that the fluid flown from the top of the piston 24 through the bore 70 into the bore 22 above the metering piston 26 so as to drive the latter downwardly in opposition to the spring 96 which is considerably weaker than the spring 64. This downward movement of the metering piston 26 will on the one hand discharge the fluid out through the bore 44 and the discharge conduit 14 through a non-return valve carried thereby, as pointed out above, and at the same time the next metering charge will be received in the bore 22 above the piston 26. Simultaneously, because of the drop in pressure resulting from the enlarged space which receives the fluid from the supply conduit 12, the spring 64 is capable of expanding and driving the pilot piston 24 back up to its top dead-center position, so that this piston 24 will again reach the position indicated in FIGS. 6 and 8.

Subsequently, the spring 96 expands because of the drop in pressure resulting from communication of the space above the piston 26 through the bore 70 with the space beneath the piston 24, and again the metered amount of liquid is transferred to the space beneath the pilot piston 24. This completes one cycle of operation of the distributing unit B of the invention, and it will be noted that a metered amount of fluid is discharged by the downward stroke of the metering piston 26 which simultaneously receives the next charge at its upper side and transfers the next charge to the space beneath the piston 23 at the end of the cycle of operations.

The above-described structure of the invention cooperates with an indicating assembly of the invention which responds automatically to the operation of the distributing means for indicating when the distributing means fails to operate in the normal manner. This indicating assembly is electrical in nature in the illustrated example. Referring to FIG. 2, it will be seen that the body means 16 of the distributing unit B carries at its top surface a block 102 made of an electrically non-conductive material, such as a suitable plastic, and a second block 104 also made of an electrically non-conductive plastic is situated over the block 102. Between these plastic blocks 102 and 104 are situated a pair of elongated electrical conductors 106 and 108 which are spaced from each other to form switch-contacts capable of being closed in a manner described below. These switch-contact members 106 and 108 are of course insulated from the remaining structure by the blocks 102 and 104.

Figure 1:
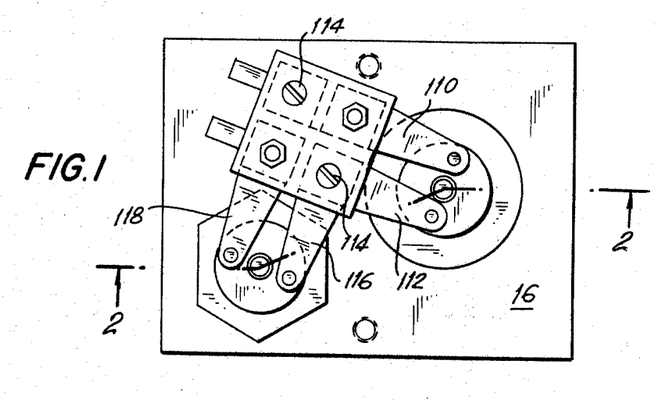
FIG. 1 is a top plan view of one of the distributing units of the invention shown in cooperation with part of the electrical structure of the indicating assembly of the invention.

A pair of additional springy switch contact members 110 and 112 are situated at the top of the block 104 and are carried thereby, and these contacts 110 and 112 are respectively situated directly over the contacts 108 and 106 in alignment therewith, so that for this reason only the contacts 110 and 112 appear in FIG. 1. The contacts 108 and 106 are respectively identical with the contacts 110 and 112 and are aligned there-beneath with the block 104 spacing these identical pairs of contacts from each other and also insulating them from each other. A pair of bolts 114 pass downwardly through aligned openings in blocks 102 and 104 so as to tightly clamp them to the body 16, and these bolts are insulated from the switch contacts so that these switch conacts are completely insulated from each other and from the other structure. A third of springy switch contacts 116 and 118 are carried by the block 104 at its top end, and the orientation of the springy switch contacts 116 and 118 with respect to the contacts 112 and 110 is most clearly apparent from FIG. 1.

The stem 86 of the metering piston 26 fixedly carries a switch closing or bridging member 120 in the form of a sleeve suitably insulated from the stem 86 and having an upper surface which engages the contacts 110 and 112 to connect them electrically to each other when the piston 26 is at its upper dead-center position shown in FIG. 2.

When the piston 26 reaches its lower dead-center position engaging the top end of the tubular portion 98a or 98b of the plug 80, the switch closing member 120 will engage with its lower surface the pair of lower contacts 106 and 108 so as to connect them electrically to each other. Because different plugs 80 having tubular portions 98a or 98b, for example, of different lengths will provide different strokes for the metering piston 26, the switch-bridging member 120 is removably connected to the stem 86 so that it can be removed and replaced by another bridging member 120 whose thickness or axial length is different from that shown in FIG. 2.

In other words, with the particular structure shown in FIG. 2, the bottom surface of the bridging member 120 is spaced from the top surface thereof by a distance which will provide electrical connection between the contacts 106 and 108 when the piston 26 engages the top end of the tubular portion 98a of the plug 80. However, if this tubular portion 98a has a different length, such as the length of the tubular portion 98b, then the member 120 will be replaced by another member having a different axial length which will provide electrical connection between the contacts 106 and 108 when the piston 26 engages the top end of a tubular portion such as the tubular portion 98b. In this way it is possible to adapt the electrical structure to different strokes of the metering piston 26.

In much the same way the pilot piston 24 is fixed at its top end to a rod which forms a coaxial extension of the stem of the piston 24 and which extends in a fluid-tight manner through the central bore of the plug 36, as shown in detail in FIG. 2. This coaxial extension of the stem of the piston 24 fixedly carries a switch closing or bridging member 122 in the form of a sleeve insulated from the stem extension on which it is mounted and engaging the contacts 116 and 118 when the pilot piston 24 is at its top dead-center position shown in FIG. 2, so that at this time the contacts 116 and 118 will be electrically connected to each other.

A pair of electrical conductors 124 and 126, indicated in FIG. 2, are respectively connected electrically with the switch contacts 110 and 118. The switch contact 110 is electrically insulated from all other elements, as was pointed out above. However, the switch contact 112 directly engages the switch contact 116, so that these contacts are always in electrical communication with each other. On the other hand the switch contact 118 is also electrically insulated from all other elements. Therefore, the conductor 124 is electrically connected with the conductor 126 only when the contacts 110 and 112 are bridged by the member 120 and at the same time the contacts 116 and 118 are bridged by the member 122. If either one of the pairs of contacts 110–112 or 116–118 are not in electrical connection with each other, then the conductor 124 and the conductor 126 cannot be in electrical connection with each other. Thus it will be seen that the upper pair of switches as shown in FIG. 2 are connected in series between the conductors 124 and 126.

The lower pair of contacts 106 and 108 are respectively connected with a pair of conductors 128 and 130 so that the latter conductors are electrically connected to each other only when the member 120 places the contacts 106 and 108 in electrical connection with each other.

All of the structure which extends above the top surface of the body 16 is housed within a transparent enclosure 132 of cup-shaped configuration formed with a pair of bores in its top wall for accommodating the shanks of a pair of screws 134. These screws pass through these bores in the top wall of the transparent housing 132 into tapped bores of the body 16 for maintaining the enclosure 132 on the body 16. Along its bottom edge the transparent enclosure 132 carries a bead 136 of rubber or the like for preventing direct engagement between the relatively sharp bottom edge of the housing 132 and the top surface of the body 16 which, as pointed out above, can be made of brass. The transparent housing 132 can be made of any suitable plastic material. As is shown most clearly in FIG. 4, a portion of the bottom edge of the housing 132 is formed with a notch 138 along which the bead 136 extends, and it is through this notch 138 that several conductors 124, 126, 128 and 130 pass so as to be connected into the electrical circuit which is indicated in FIG. 9.

The manner in which the distributing unit B cooperates with the above-described switch structure provided for each unit is indicated in FIGS. 6–8.

Thus, referring to FIGS. 6–8, it will be seen that at the beginning of an operating cycle when the pilot and metering pistons are at their top dead-center positions, as shown in FIG. 6, the bridging members 120 and 122 simultaneously close the upper pair of switches in the manner indicated in FIG. 6, so that at this time the conductors 124 and 126 are in electrical communication with each other. At all other times of an operating cycle the circuit which includes the conductors 124 and 126 is open. FIG. 7 indicates how, when the metering piston 26 reaches the bottom of its stroke, completing the discharge of the metered amount of lubricant from the distributing unit, the member 120 completes the circuit through the contacts 106 and 108 so that the conductors 128 and 130 are in electrical communication with each other.

These conductors remain in communication with each other during that part of the operating cycle shown in FIG. 8 where the refill for the next metered discharge is situated on top of the metering piston 26 and is about to be transferred back to the bore 20 beneath the pilot piston 24. At this time, while the switch contacts 116 and 118 are placed in electrical connection with each other, the metering piston 26 is at the bottom of its stroke providing electrical communication between the conductors 128 and 130.

The circuit which includes the conductors 124 and 126 will remain closed until the metering piston 26 returns to its upper dead-center position shown in FIG. 6.

The above-described electrical structure of the indicating assembly of the invention is shown together with the remaining structure of one possible embodiment of an indicating assembly of the invention in FIG. 9. The several switches formed by the contacts 106 and 108 form the switches E indicated in FIG. 9. Inasmuch as each set of switch contacts 110–112 and 116–118 form in effect a single switch since both of these pairs of contacts must be simultaneously bridged to complete the connection between the conductors 124 and 126, these pairs of switch contacts for each distributing unit are indicated in FIG. 9 as forming a single switch F. Thus, it will be seen that each of the three units B in FIG. 9 has a pair of switches E and F cooperating therewith and these switches are actuated by the structure described above and shown in the drawings.

The indicating assembly D of the invention is shown as including a green lamp G which, when illuminated, indicates to the operator that the group of units B connected to the single indicating assembly D in the manner shown in FIG. 9 are all operating properly. The indicating assembly also includes a red lamp R which, when illuminated, indicates to the operator that at least one of the distributing units B of the group connected to the single indicating assembly D is not operating in the normal manner.

The indicating assembly D is connected to the lines $L_1$ and $L_2$ so as to receive the required electrical energy, and also directly connected into the lines is a manually operable switch H which can be opened or closed by the operator for the purpose of turning the entire indicating assembly on or off.

As is apparent from the upper right portion of FIG. 9, a conductor 140 which is connected into the circuit is electrically connected with the conductor 142 in which the lamp G is located. This conductor 142 terminates at a contact $a$ which form part of a relay switch K which normally assumes the position shown in FIG. 9, where this switch K provides an electrical connection between the contacts $a$ and $b$. Thus, at this time the conductor 142 which carries the lamp G is connected through the switch K with a conductor 144 which is connected to the other of the lines $L_2$, so that it will be observed that at the position of the part shown in FIG. 9 the green lamp G is illuminated thus indicating proper operation. Inasmuch as the several switches E are closed in FIG. 9, it is clear that the parts are shown therein at the position they take when the discharge of the metered amount of lubricant through the conduits 14 has been completed, the parts being shown in FIG. 9 in a position corresponding to that of FIG. 7.

The switch K is coupled to switch M which is part of the same relay which includes the relay coil N, and when this coil is energized the contact $c$ will be electrically connected to the contact $b$ through the switch K, while the switch M will now connect contact $d$ to the conductor 142. However, in the illustrated position of the parts the coil N is unenergized and the switches K and M assume their normal positions shown in FIG. 9.

A conductor 146 is also connected electrically through the conductor 140 with the ine $L_1$, and it is this conductor 146 which connects the line $L_1$ to the coil N. This coil is in turn connected through conductor 148 with the series connected switches F which in turn are connected through the conductor 150 with the conductor 144 which is connected to the other line $L_2$. It is clear, therefore, that when the switches F are closed, corresponding to the position of the parts shown in FIG. 6, the relay coil N will be energized and the switches K and M will be moved to their other positions placing the contacts $c$ and $d$ in the circuit. As a result the conductor 142 of the lamp G will no longer be connected with the contact $b$ so that its connection to the line $L_2$ through the conductor 144 is interrupted. However, the energizing of the coil N instantaneously connected the conductor 142 with the contact $d$ through the switch M, so that now the lamp G is connected through the conductor 152 with the contact $e$ of a time delay relay $T_1$. The contact $e$ serves in the illustrated position to connect this contact with a contact $g$ which in turn is connected with a conductor 154 also connected through the switches F and the conductors 150 and 144 with the line $L_2$, so that at this time when the several switches F are all simutaneously closed, the lamp G will still remain illuminated, although the circuit passes through the time delay relay $T_1$.

As soon as the operating cycle moves beyond that part thereof which is shown in FIG. 6, the several switches F will automatically open and the relay coil N will become unenergized so that the switches K and M will return to the positions shown in FIG. 9 thus maintaining the lamp G energized through the switch K which in the manner described above connects the conductor 142 through the contacts $a$ and $b$ with the conductor 144 which goes to the line $L_2$.

Thus, during normal operation the lamp G will always be energized either by way of the above-described elements when the several switches F are open as shown in FIG. 9 or when the several switches F are closed.

When the coil N is energized, not only is the conductor 142 connected to the conductor 152 by the switch M, but in addition the switch K provides an electrical connection between the contacts $b$ and $c$, so that now the relay coil P is connected into the circuit inasmuch as the movement of the switch K electrically connects the conductor 146 to the conductor 144 and the line $L_2$.

Thus, the energizing of the coil N will also result in energizing of the coil P, and the result is that the switch Q will be actuated so as to disconnect the contact $h$ from the conductor 158 which is connected with the relay coil $j$ which forms part of a second time delay relay $T_2$. Thus, the normally closed switch Q is opened when the relay coil P becomes energized.

The coil $j$ controls the switch S and latches the latter in the position illustrated in FIG. 9. This time delay relay $T_2$ will during normal operation receive impulses in a time sequence which will guarantee that the switch S remains latched in the position illustrated. Only if the relay $T_2$ fails to receive an impulse after a given interval will the latching structure automatically release the switch S which will change its position so as to short circuit the coil $j$ through a resistor of the relay by placing the switch S in engagement with the contact $i$, while at the same time the switch S connects the contact $k$ with the line $L_2$ through the conductor 164.

Thus the lamp R becomes energized, and with the illumination of this red light the operator will know that something is wrong.

The coil $j$ is periodically energized during normal operation by the closing of a relay switch which engages the contact $l$ as well as by the closing of a switch U. It is to be noted that all three switches U, Q and the relay switch which engages the contact $l$ must be closed to energize the coil $j$, and it is this periodic energizing of the coil $j$ which will maintain the switch S latched in the position shown where the lamp R will not become illuminated by connection of the contact $k$ with the conductor 164.

The switch U is controlled by a relay coil V connected by the conductor 160 with the line $L_1$, and it is this relay coil V which is connected through the conductor 162 with the switches E which, it will be recalled, are all simultaneously closed upon reaching of that part of the operating cycle of the several units where the discharge of a metered amount of lubricant has been completed, as shown in FIG. 7. Thus, when the several switches E are closed, as indicated in FIG. 9, the relay coil V will be connected through these switches and the conductors 150 and 144 to the line L₂ so that the switch U is open and this switch U is a normally closed switch which, in the same way as the switch Q, will be closed when its relay coil is unenergized.

As is apparent from the above description, the green lamp G will remain continuously illuminated during normal operation and the red lamp R can only be illuminated either when the contact $k$ is connected to the conductor 164 or when the switch O of the time delay relay $T_1$ changes its position so as to connect the contact $g$ with the contact $f$.

It is apparent from the above description that in the event of failure of any unit B to operate in the normal manner, one of three different occurrences will take place. Either the switch F will remain closed for an exceedingly long period of time, or the switch E will remain closed for an exceedingly long period of time, or either one or both of these switches will remain open for an exceedingly long period of time. In the event that a switch E remains closed for an exceedingly long period of time, beyond the normal cyclical period of closing thereof, the coil V will remain energized to maintain the switch U open for a length of time sufficient to prevent the latch of the time delay relay $T_2$ from maintaining the switch S in the illustrated position, so that as a result the contact $k$ will be connected to the conductor 164 and the red lamp R will be energized.

In the event that one of the switches F remains closed for an exceedingly long period of time, the relay coil P will remain energized for an exceedingly long period of time and in this case also the switch S will act to cause the light R to be energized in the above-described manner.

If the switches F remain open for an exceedingly long period of time, this is an indication either that only these switches are open for on exceedingly long period of time, or that these switches plus the switches E are open for an exceedingly long period of time, so that all other situations are taken care of by excessively long periods of opening of the switches F. It is the periodic closing of the switches F which through the conductor 154 acts on the time delay relay $T_1$ for maintaining the switch O thereof in the illustrated position.

In the event that an impulse is not received within a given period of time by closing of the switches F, the switch O will change its position connecting the contact $e$ with the contact $g$, as shown, and instead contact $f$ will be connected with the contact $g$. As a result the lamp R which is permanently connected through the conductor 140 with the line $L_1$ will now be connected through the relay $T_1$ with the conductor 154 which through the coil N and the conductor 146 is connected to the lamp G which in turn is connected through the conductor 142 and the switch K with the conductor 144 and the line $L_2$, so that at this time the lamp R will be energized together with the lamp G and the operator will know that there is faulty operation.

Thus, the three possible situations are taken care of. With the structure of the invention, irrespective of whether the green light is illuminated, the illumination of the red lamp will indicate that something is wrong, and because of the series electrical connection between the group of units B which are coupled to the single indicating assembly D as shown in FIG. 9, it is clear that a problem with any one of the group of units B will cause a response in the indicating assembly D for indicating to the operator that something is wrong.

Therefore, one of the further features of the invention is to provide a number of indicating assemblies D which is far smaller than the number of units B. According to the detecting method of the invention a group of units B which happen to be clustered adjacent each other at a given area will be coupled in the manner shown in FIG. 9 with a single indicating assembly D.

If there are only one or two distributing units B at a given region, then only this number will be connected to a single indicating assembly. However, there may be as many as ten or twelve distributing units B situated close to each other at a given part of a given machine, in which case the entire group of ten or twelve or even more distributing units can be coupled to a single indicating assembly D. When the red lamp of such an assembly is illuminated, the operator will go to the entire group and by looking through the transparent housing in which the reciprocating stems are located, the operator can visually determine which of the several units of a given group is not operating properly.

Thus the indicating red lamp R of a given assembly will only indicate to the operator that perhaps one or more than one of the distributing units of a group are not operating properly, and it is then by visual inspection of the units themselves that the operator will very quickly determine where the trouble is.

As many changes could be made in the above fail safe indicator and metering valve, and many widely different embodiments of the invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A distributing unit for a fluid distribution system including
   a first and a second bore each surrounded by a wall and in which are respectively positioned a first and a second reciprocable piston;
   said first piston including a first and a second land each having a width such that it engages the interior surface of the wall surrounding said first bore in fluid-tight seal; said first piston including a narrowed width portion between said lands;
   said first bore having an inlet thereto which communicates with a source of fluid to be distributed; biasing means for biasing said first piston to move in a first direction toward a first terminal position; said first terminal position for the movement of said first piston being located so that said first land is adjacent to said inlet when said first piston is at said first terminal position; means for preventing said first piston from moving further in said first direction than said first terminal position, whereby fluid entering said first bore through said inlet will operate upon said first land to move said first piston in a second direction, opposite said first direction;
   a first conduit communicating with said first bore at a location such that fluid entering and leaving said first bore through said first conduit communicates with said narrowed portion of said first piston and with one side of said first land when said first piston is in said first terminal position; said first land of said first piston being of such length that when said first piston has shifted in said second direction a predetermined distance from said first terminal position, said first land is in position to block fluid communication between said first conduit and said first bore;
   said first land of said first piston also being of such length that after said first piston has shifted a further predetermined distance in said second direction, said first land passes said first conduit and said first conduit now communicates with said first bore on the other side of said first land from said narrowed portion of said piston; a second terminal position for said first piston which is still further in said second direction, and means for preventing said first piston from moving in said second direction further than said second terminal position;

a second conduit communicating with said first bore at such a location that it is always in fluid communication with said narrowed portion of said first piston as said first piston shifts;

an outlet from said first bore to transmit fluid to a fluid receiving device; said outlet being so located that while said first piston is at said first terminal position, and as said first piston is moving away from said terminal position in said second direction, said second land of said first piston is blocking said outlet and preventing fluid communication between said first bore and said outlet;

said second land of said first piston being of such length that after said first piston has shifted approximately said further predetermined distance in said second direction, said second land passes from its blocking position with respect to said outlet, whereby said outlet is in liquid communication with said narrowed portion of said first piston;

said second piston being movable in its said second bore in a third direction to a third terminal position and being movable in a fourth direction, opposite said third direction, to a fourth terminal position; means for preventing said second piston from moving beyond said third and said fourth terminal positions;

said second pistont having one land of a width such that it engages the walls surrounding said second bore in fluid-tight seal;

biasing means, weaker than said biasing means for said first piston, for biasing said second piston to move in said third direction;

said first conduit communicating with said second bore at a location such that said first conduit is always in fluid communication with one side of said land of said second piston;

said second conduit communicating with said second bore at a location such that it always is in fluid communication with the other side of said land of said second piston;

whereby fluid may be pumped from said first bore inlet out said first bore outlet.

2. The distributing unit for the fluid distributing system of claim 1, further including indicating means, operatively connected with said distributing unit and being adapted to automatically respond to the operation thereof, for indicating when said unit fails to operate normally.

3. The distributing unit for the fluid-distributing system of claim 2, wherein said indicating means includes electric switch means actuated by said first and second pistons in response to reciprocation thereof, and indicating means including an electrical circuit in which said switch means is located for indicating when said pistons fail to properly operate.

4. A fluid-distributing system comprising,
a plurality of distributing units of claim 1;
a source of fluid to be pumped;
parallel fluid connections with said source for each of said inlets to said distributing units.

5. The fluid-distributing system of claim 4, further including switch means operatively connected to the pistons of each distributing unit, and an electrical circuit connected with all of said switch means and having branches in which said switch means are located to be opened and closed by movement of said pistons, and an indicating assembly, including said switch means and an electrical circuit and further including an electrical indicating structure for indicating when said plurality of switch means fails to be actuated in a normal manner by said pistons.

References Cited
UNITED STATES PATENTS

| | | |
|---|---|---|
| 2,908,898 | 10/1959 | Mueller et al. |
| 3,038,557 | 6/1962 | Callahan. |
| 3,223,198 | 12/1965 | Gruber. |
| 3,272,285 | 9/1966 | Thomas. |
| 3,381,776 | 5/1968 | Gruber et al. |

HOUSTON S. BELL, JR., Primary Examiner

U.S. Cl. X.R.

184—7; 222—252